United States Patent [19]

Hasa et al.

[11] 4,190,085
[45] Feb. 26, 1980

[54] GAS FLOW REGULATING AND MEASURING APPARATUS

[75] Inventors: Juhani Hasa; Arvi Tolmunen, both of Kausala, Finland

[73] Assignee: Halton Oy, Finland

[21] Appl. No.: 948,792

[22] Filed: Oct. 5, 1978

Related U.S. Application Data

[63] Continuation-in-part of Ser. No. 766,795, Feb. 8, 1977, abandoned.

[30] Foreign Application Priority Data

Jun. 8, 1976 [FI] Finland ................................ 761622

[51] Int. Cl.² ............................................. F16D 1/02
[52] U.S. Cl. ......................................... 138/45; 138/46
[58] Field of Search ................. 138/46, 45, 43, 40, 138/37; 239/451

[56] References Cited

U.S. PATENT DOCUMENTS

| 1,108,128 | 8/1914 | Buffum | 138/45 |
|---|---|---|---|
| 2,934,892 | 5/1960 | Hurlbert et al. | 138/45 |
| 2,934,966 | 5/1960 | Wood | 138/45 |

Primary Examiner—Lenard A. Footland
Attorney, Agent, or Firm—Steinberg and Blake

[57] ABSTRACT

For controlling and measuring the flow of a gas in a duct, apparatus including a collar member adapted to be sealingly connected to the duct and a plurality of overlapping throttling blades pivotally carried by mounting means situated within the collar member. These blades define the side surface of a truncated cone and have upstream end regions defining the base of the cone and downstream end regions defining the of the truncated cone as well as a throttling aperture through which the gas is adapted to flow. The blades are appropriately shaped and positioned so that one side edge region of each throttling blade overlaps and resiliently engages an adjacent side edge region of an adjacent throttling blade with a positive bearing force which results in a fluidly sealed engagement between each pair of adjacent blades so that the truncated cone defined thereby is rendered gas sealed. It is possible to adjust the inclination of the blades and, therefore, the size of the throttling aperture by adjusting the position of at least one blade which thereby transmits a pivoting force to adjoining blades. Apparatus may be operatively associated with the collar member to measure the pressure differential of the gas flow stream between a first location upstream of the truncated cone and a second location defined by the truncated cone in the vicinity of the apex thereof in order to measure the rate of gas flow.

14 Claims, 11 Drawing Figures

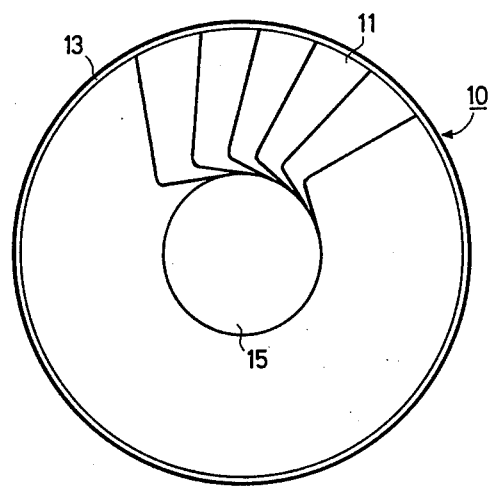
FIG. 1
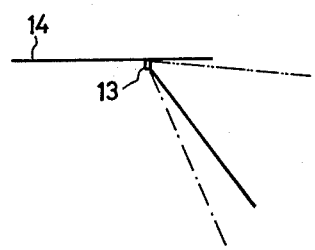
FIG. 2
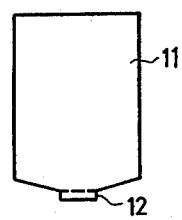
FIG. 3
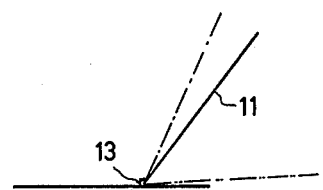

GAS FLOW REGULATING AND MEASURING APPARATUS

BACKGROUND OF THE INVENTION

This application is a continuation-in-part of application Ser. No. 766,795 filed Feb. 8, 1977, now abandoned.

The present invention relates to structures for controlling and measuring gas flow.

In particular, the present invention relates to structures adapted to be connected to a duct for controlling and measuring the flow of gas therethrough.

The present invention concerns in particular a control and measuring means for gaseous fluid flow, this control means having a control structure consisting of a plurality of throttling blades which overlap each other.

Various types of controls are presently utilized for purposes such as air-flow measurement and control of the air intake and exhaust duct systems of air conditioning installations. The simplest known control means of this type is a control damper disposed within a duct. This damper may be turned so as to control the cross section through which the gas is permitted to flow, so that in this way it is possible to change the volume of gas which flows through the duct. One of the primary drawbacks of this type of control structure resides in the fact that the adjustment thereof changes the direction of gas flow.

There are also known gas-flow controlling structures in the form of iris units having throttling blades which are situated in a plane normal to the axis of the duct, these blades being movable in the latter plane. However, a control structure of this type is relatively expensive as a result of the high manufacturing and installation costs thereof. In addition, the range of control which can be achieved with such a construction is limited inasmuch as the maximum flow aperture of such a construction is substantially smaller than the cross section of the hollow interior or flow lumen of the duct.

Additionally, variable area nozzle structures are known for controlling the gas exhaust from jet propulsion engines which include an array of hinged overlapping blade members (see, for example, U.S. Pat. No. 2,934,966). However, such prior art structures have not been employed for the purpose of precisely controlling or measuring gas flow through ducts since the nozzle defining blade members are neither appropriately shaped nor sealingly mounted to define a gas directing member which is sufficiently air-tight for such purposes.

SUMMARY OF THE INVENTION

It is a primary object of the present invention to provide a gas-flow control and measuring apparatus which will avoid the drawbacks of the above known structures.

Thus, it is an object of the present invention to provide a gas-flow control and measuring apparatus which is relatively inexpensive to manufacture and mount.

Also, it is an object of the present invention to provide a gas-flow control and measuring apparatus which can be connected to a duct in such a way that the cross section of the path of gas flow through the apparatus of the invention, when providing minimum throttling action, is substantially equal to the cross section of the hollow interior of the duct.

It is also an object of the present invention to provide a control and measuring apparatus of this type capable of distributing the gas flow uniformly with respect to the duct axis in all adjusted positions of the apparatus of the invention without changing the direction of gas flow when the device of the invention is adjusted to change the extent to which the gas flow is throttled.

It is yet another object of the present invention to provide a control and measuring apparatus having a plurality of overlapping throttling blades defining the side surface of a truncated cone wherein the blades are appropriately shaped and positioned so that adjacent blades are sealingly engaged with each other so that the truncated cone is air tight.

It is also an object of the present invention to provide a structure which can easily be provided with thermal lagging or insulation to avoid fire hazards.

According to the invention, the apparatus thereof includes a collar member surrounding a central axis which passes through the center thereof. A plurality of throttling blades are pivotally supported by means mounted within the collar member for turning movement with respect thereto, these blades overlapping each other and being distributed along the ring means as well as around the above axis with the blades defining the side surface of a truncated cone whose central axis coincides with the above axis. Each of the throttling blades overlaps and resiliently engages an adjacent throttling blade with a positive bearing force thereagainst resulting in a fluidly sealed engagement between those adjacent blades. By this provision, the truncated cone defined by the plurality of throttling blades is rendered air tight. These blades have upstream ends which define the base of the truncated cone and downstream ends which define the apex of the truncated cone as well as the throttling aperture through which the gas flows. Thus, when the above structure is situated in sealed engagement with a duct through which a gas stream flows, the gas is directed through the collar member and cone defining throttling structure. It is possible to turn the blades with respect to the ring means to adjust the inclination of the blades and thus the size of the throttling aperture defined by the downstream ends of the blades by adjusting a single blade which in turn transmits an adjusting force to the adjoining blades. The apparatus of the present invention may be provided with means for measuring the pressure differential of the gas flowing therethrough between a first location upstream of the truncated cone throttling structure and a second location therewithin in order to obtain the flow rate of the gas flowing through the duct.

BRIEF DESCRIPTION OF DRAWINGS

The invention is illustrated by way of example in the accompanying drawings which form part of this application and in which:

FIG. 1 is a schematic elevation of an apparatus according to the present invention taken in a plane normal to the axis of the collar member and showing the structure of the invention fragmentarily when looking toward the throttling aperture of the structure of the invention;

FIG. 2 is a schematic illustration of the manner in which the structure of the invention can be adjusted for controlling the throttling aperture;

FIG. 3 is a plan view of one of the overlapping throttling blades of the present invention;

DESCRIPTION OF PREFERRED EMBODIMENTS

Figure 3A:
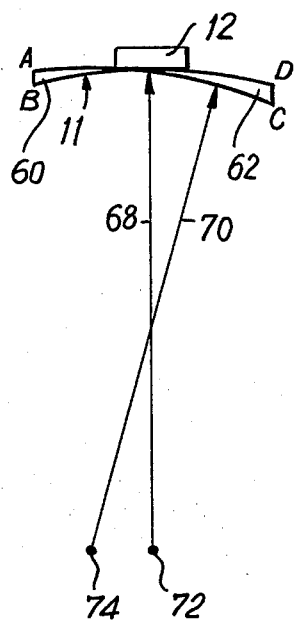
FIG. 3A is a front view of a throttling blade of the present invention illustrating the warped, curved nature thereof.
Figure 3B:
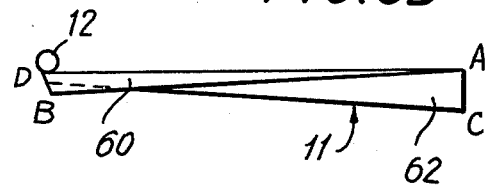
FIG. 3B is a side view of a throttling blade of the present invention also showing its warped, curved nature.

Referring now to FIGS. 1-3, a gas flow control apparatus 10 according to the present invention includes a plurality of throttling blades 11, one of which is illustrated in FIGS. 3-3B. These blades are arranged so they mutually overlap each other in the manner apparent from FIG. 1 and as discussed below in detail. Thus, as is apparent from FIG. 1, where only a relatively small number of blades are illustrated, the several throttling blades 11 engage each other with the surface of each blade which is apparent in FIG. 1 extending behind and engaging the surface of the next blade considered in a clockwise direction, as viewed in FIG. 1.

Referring to FIG. 3 in conjunction with FIGS. 3A and 3B, the detailed construction of a throttling blade 11 of the present invention is illustrated. It is understood that all of the throttling blades incorporated in the apparatus of the present invention are substantially identically shaped as the throttling blade 11 illustrated in FIGS. 3 through 3B. Each throttling blade is preferably constructed of hot galvanized sheet steel of the type commonly employed in ventillating ducts and the like. The thickness of the blades may vary depending upon the size of the apparatus which, of course, depends upon the size of the ducts with which it is to be associated. Thus, the thickness of the blades may vary from about 0.5 mm. for small duct flow systems to about 1 mm. for larger applications. Further, each blade 11 is formed having a curved, warped surface. More particularly, referring to FIGS. 3A and 3B, it is seen that each throttling blade is defined by a substantially rectangular plate member having first and second longitudinally extending side edge regions 60, 62 and upstream and downstream edge regions 64, 66. The side edge regions intersect the upstream and downstream edge regions at four corner portions, designated A-D in FIGS. 3A and 3B. Thus, any transverse cross section, such as that designated T—T in FIG. 3B of a blade 11 describes an arc of a circle having a certain radius of curvature, each transverse cross section taken along the length of a blade 11 describing a circular arc of equal radii of curvature. The warped nature of each blade 11 is best seen in FIG. 3A wherein the radii of curvature of the upstream edge D-B and the downstream edge A-C are designated 68, 70, respectively. Thus, it is seen that the lengths of radii of curvature 68, 70 are equal. However, the center of curvature of the upstream edge D-B, designated by the point 72 is seen to be laterally displaced with respect to the center of curvature of the downstream edge A-C, designated by the point 74. The transverse cross sections of blade 11 intermediate the upstream and downstream edges thereof all have radii of curvature which are displaced between centers of curvature 72, 74 as the transverse cross section is taken longitudinally along the blade. Thus, the curved, warped nature of each blade 11 is clearly illustrated in FIGS. 3A and 3B.

In accordance with the invention the several throttling blades 11 are pivotally supported by mounting means which, in the illustrated embodiment comprises ring means 13 which surrounds a central axis passing through the center of the ring means and being normal to a plane containing the same, this axis coinciding with the axis of a collar member 14 which is schematically illustrated in FIG. 2. Collar member 14 is appropriately sized in accordance with the dimensions of duct members (not shown) with which it is adapted to be connected in fluid sealing engagement. Thus, O-rings may be provided over the end regions of collar member 14 (FIG. 9) to provide a sealing engagement of collar member 14 with a pair of duct members connected to the respective end regions thereof. It will be readily seen that a gas flow stream passing through a duct member will thereby be directed into the collar member 14 where it is subsequently throttled by the blade structure discussed below.

In order to pivotally support the several blades 11 on the ring means 13, these blades 11 may simply be hingedly connected to the ring means. Thus each blade 11 has a portion 12 formed with a bore passing therethrough, and the ring means 13 passes through this bore so that in this way the several blades 11 are swingably carried by the ring means 13 to assume the different positions schematically illustrated in FIG. 2. Thus, the several throttling blades 11 will form the side surface of a truncated cone. The bored portions 12 of the several blades 11 are distributed around the ring means 13 which may take the form of a simple wire passing through the bored portions 12. For example the ring means 13 may take the form of a circular ring made of steel wire which not only passes through the several bored portions 12 of the several blades 11 but which also has a diameter substantially equal to the inner diameter of the duct 14 to which the ring means 13 is fixed in any suitable way. If desired, for example, the duct 14 may be provided with an inner circular groove for receiving the steel wire 13 and within this groove it is possible to provide circumferentially distributed apertures for the several hinges 12 of the throttling blades 11.

As may be seen from FIG. 2, by way of any suitable means which is not illustrated in FIG. 2, such as a suitable linkage mechanism, it is possible to control the aperture through which the gas flows by turning the several throttling blades 11 about the ring means 13, so as to control the taper or inclination of the truncated cone which is defined by the blades 11. As is apparent from FIG. 2, the several blades 11 are connected to the ring means 13 at their upstream end regions which define the base of the truncated cone while the downstream end regions define the apex of the truncated cone and which thus define the throttling aperture through which the fluid must flow from the left toward the right, as viewed in FIG. 2, along the interior of the collar member 14.

As mentioned above the throttling blades 11 are arranged so they mutually overlap each other in the manner shown in FIG. 1. By virtue of the particular material from which the blades are constructed as well as the particular configuration thereof, described above, one of the longitudinally extending side edge regions 60, 62 of each blade 11 overlaps and resiliently engages the other one of the longitudinally extending side edge regions of an immediately adjacent blade with a positive bearing force in a manner such that a fluidly sealed engagement is defined between the two engaging side edge portions of the adjacent blades. Thus, the hot galvanized sheet steel material having thicknesses as described above, are relatively resilient or elastic to the extent that the blades are somewhat deformable at their side edge regions such that upon being so deformed, the blade edge portions exert a restoring force in the direction which would tend to return the blade to its original configuration. Thus, referring to FIGS. 3A and 3B in conjunction with FIG. 1, the blades 11 are mounted so that side edge region 60 of each blade overlaps and sealingly engages the side edge region 62 of an adjacent blade 11 in the counterclockwise direction as seen in FIG. 1. The mounting is such as to create a positive bearing force which side edge region 60 of the overlapping blade 11 exerts on side edge region 62 of the overlapped blade. By virtue of this provision, the truncated cone defined by the plurality of throttling blades is substantially air or gas tight, and accordingly, may be utilized in a manner discussed below for precisely controlling and measuring the gas flow through the ducts with which the apparatus is associated.

When the several blades 11 are adjusted to have the solid line position shown in FIG. 2, the blades 11 will define at their downstream ends a throttling aperture 15 as illustrated in FIG. 1. The several blades 11 can be turned so as to reduce the size of the throttling aperture, so that it is smaller than the aperture 15 shown in FIG. 1, and the blades 11 will now, for example, occupy the dot-dash line position shown in FIG. 2 to the left of the solid line position. This latter position represents the maximum throttling aperture, which is to say a flow aperture of minimum size. On the other hand, the several blades can be turned so as to extend substantially along the inner surface of the collar member 14, assuming now the dot-dot-dash line position shown in FIG. 2 to the right of the solid line position of the blades 11. This position represents the minimum throttling aperture, which is the maximum flow aperture through which the gas can flow, and it will be noted that this maximum aperture corresponds approximately to the inner diameter of the collar member 14. The shape and size of the throttling blades can be properly chosen to fit a particular collar member, and the flow aperture at maximum throttling can be made exceedingly small so that the air flow at this time can be practically zero.

Figure 4:
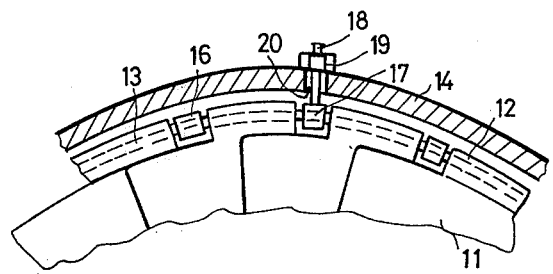
FIG. 4 is a fragmentary sectional illustration, taken in a plane normal to the axis of the collar member and showing part of the collar member as well as part of the throttling blades and mounting means which supports the same.
Figure 5:
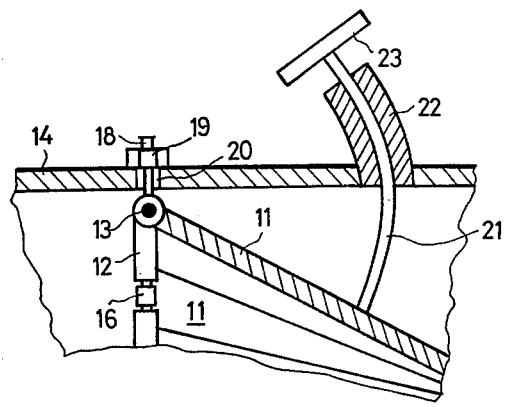
FIG. 5 is a fragmentary longitudinal sectional elevation taken in a plane which contains the axis of the collar member, FIG. 5 showing part of the collar member and part of the blades of FIG. 4 as well as part of a structure for controlling the inclination of the blades.

Referring to FIGS. 4 and 5, there is fragmentarily illustrated therein the circular wire 13 extending through the apertured portions 12 at the upstream end regions of the blades 11 so as to support the latter for pivotal movement. Suitable axially bored spacers 16 may be situated between the portions 12 to distribute the blades 11 properly along the wire 13. Some spacers 17 are fixed with bolts 18 passing respectively through openings 20 in the duct 14 and carrying nuts 19 for fixing the wire 13 in the manner shown in FIGS. 4 and 5. For example the several spacers 17 with the fastening means connected thereto may be situated at 90° from each other along the ring 13.

By way of example there is shown in FIG. 5 a means for adjusting the blades 11, this means including one or more curved rods 21 extending along a circle whose center is in the center of the cross section of the ring 13 as shown in FIG. 5. A suitable guide tube 22 which also extends along this circle is fixedly carried by the duct 14 with the rod 21 passing slidably therethrough so as to be guided thereby. Outside of the duct 14 the rod 21 carries a suitable handle 23. A pair of these rods 21 and structure associated therewith may be situated at diametrically opposed sides of the duct 14, so that the operator by moving the handles 23 toward or away from each other can change the inclination of the blades 11 so as to control the aperture through which the gas flows in the manner described above. Of course, because of their mutually overlapping relationship, each blade 11 will transmit its inward or outward movement to the neighboring blades. Thus, the above described aperture controlling adjusting means is operatively connected to at least one of the throttling blades but not to blades which are adjacent to that particular blade. The pivotal movement of that blade effectuated by the movement of rod 21 causes that blade in turn to transmit a force to the pair of adjacent blades which flank the same which, in turn, transmits equal adjusting forces to blades adjacent to them. In this manner, an extremely simple yet effective device for controlling the size of the throttling aperture is provided.

Figure 6:
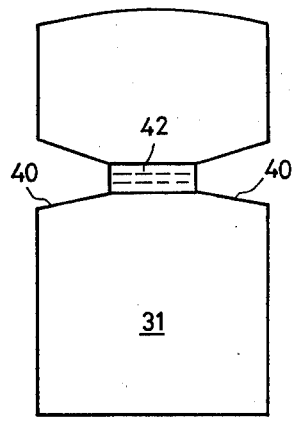
FIG. 6 shows in elevation another embodiment of a throttling blade of the invention.
Figure 7:
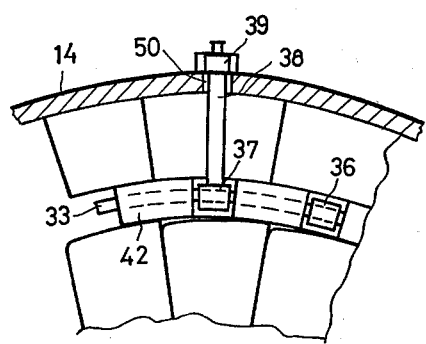
FIG. 7 is a fragmentary view, in a plane normal to the central axis, showing part of a collar member and some of the blades of FIG. 6 forming an apparatus of the invention as well as mounting means assembled with these blades.
Figure 8:
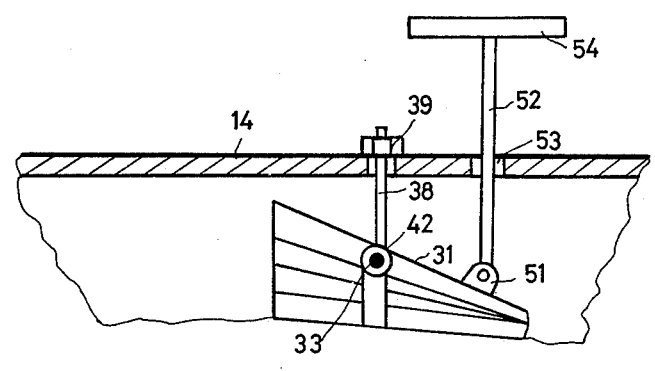
FIG. 8 is a fragmentary longitudinal sectional elevation, in a plane containing the axis, showing part of the collar member and part of the blades and mounting means of FIGS. 6 and 7 together with a means for adjusting the structure.

It is also possible, as shown in FIGS. 7 and 8 to provide a ring means 33 corresponding to the ring means 13 but having a diameter substantially smaller than the inner diameter of the collar member 14. In this case the blades 11 are replaced by blades 31 as illustrated in FIG. 6. Thus these blades are provided with inwardly extending side notches 40 between which is located a bored hinge portion 42 through which the circular wire 33 passes. Between the portions 42 are located axially bored spacers 36 through which the wire 33 also passes, and some of these spacers 37 are fixed with bolts 38 which pass through openings 50 in the duct 14, suitable nuts 39 being threaded onto these bolts 38 at the exterior of the duct 14 as shown in FIGS. 7 and 8. These fasteners 38, 39 together with the spacers 37 fixed to the inner ends of the bolts 38 may be situated at 90° from each other around the ring 33. The several blades 31 also overlap each other in the manner shown in FIGS. 7 and 8. In order to adjust the inclination of the blades, one or more of the blades 31 may have fixed thereto, as by welding, a bracket 51 to which a rod 52 is pivotally connected at its inner end, this rod 52 passing through a relatively short longitudinal slot 53 formed in the duct 14 and carrying at its outer end a handle 54. Thus a pair of rods 52 with the structure associated therewith may be situated at diametrically opposed parts of the duct 14. As is apparent from FIG. 8, by moving the rods 52 inwardly or outwardly it is possible to adjust the inclination of the blades 31 and thus the size of the throttling aperture defined by the downstream ends of the blades 31. While any suitable releasable holding devices may be provided for releasably maintaining the rods 52 or the rods 21 in adjusted positions, the frictional engagement between the several blades 11 or 31 will in general be sufficient for this purpose. Blades 31 are preferably formed having a curved, warped configuration similar to that described above in connection with blades 11. Thus, in a manner similar to the construction described above in connection with FIGS. 1 through 3, the overlapping blades define a truncated cone which is substantially air or gas tight.

It will be noted that with the embodiment of FIGS. 6–8, as contrasted with that of FIGS. 1–5, when the throttling is reduced from the maximum throttling, where the flow aperture at the center of the duct is at a minimum, there will be an increase in the annular flow aperture situated between the ring means 33 and the inner surface of the duct 14. Thus when the central downstream aperture defined by the blades 31 increases, there is also an increase in the path of flow along the inner surface of the duct.

As was indicated above, although it is not necessary, suitable releasable holding devices may be provided for holding the rods 21 or 52 in their adjusted positions. For this purpose the handles 23 and 54 may be removed, and a pair of lock nuts may be threaded onto these rods, such lock nuts engaging the outer end of the guide 22 in the case of FIG. 5 and engaging the outer surface of the duct 14 in the case of FIG. 8.

Figure 9:
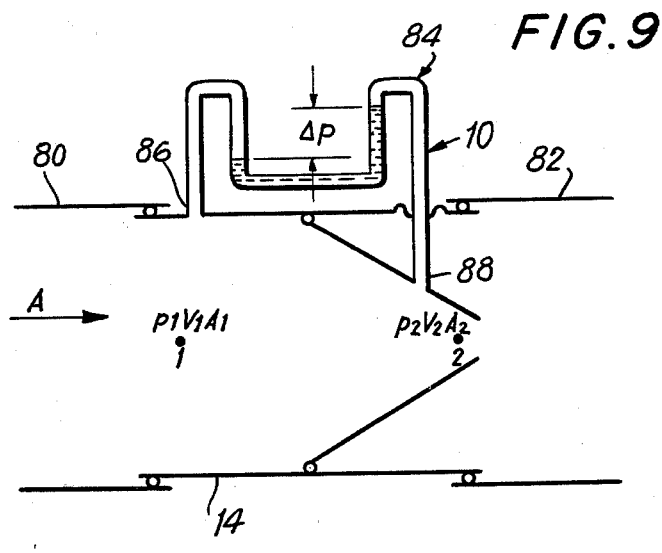
FIG. 9 is a schematic elevation of an apparatus according to the present invention shown in operative engagement with a pair of duct members, the apparatus being provided with means for measuring the pressure differential between two points in the gas flow stream.

Referring to FIG. 9, the apparatus 10 of the present invention is illustrated in operatively engaged condition with a pair of ducts 80, 82 through which a gas flow stream passes in a direction designated by arrow A. The apparatus 10 is provided with a means by which the pressure differential of the gas between two points, designated 1 and 2, can be measured. This is advantageous in that upon obtaining such pressure differential, the flow rate of the gas through the ducts can be easily obtained as described immediately below. Thus, a manometer 84 is provided exteriorly of collar member 14 having ends 86, 88 which fluidly communicate with first and second locations, respectively, the first location with which manometer end 86 communicates is located upstream of the truncated cone throttle structure and is designated by point 1 while the second location is substantially at the throttling aperture of the truncated cone throttling structure, designated point 2. Thus, as is well known, the gas flow at point 1 will have a higher pressure than the gas flow at point 2 and this pressure differential will be indicated by the height of a column of liquid, such as mercury, provided in the U-shaped portion of manometer 84. Assuming that the area of the flow stream defined by the diameter of collar member 14 ($A_1$) is known and the area of the throttling aperture ($A_2$) is known, the velocity of the gas flow at point 1 can be obtained from the following equation:

$$p_1 - p_2 = \Delta p = \frac{\rho v_1^2}{2} \left( \frac{A_1^2}{A_2^2} - 1 \right)$$

The volume flow rate of the gas at point 1 then, of course, is $v_1 \cdot A_1$.

Thus, the apparatus of the present invention advantageously functions in a dual capacity, namely, as a control apparatus for regulating the velocity of the gas flow in ducts, and, as a measuring apparatus for determining the velocity of the gas flow. The adjusting rod 21 (FIG. 5) may be appropriately indexed so that the area of the throttling aperture can be readily obtained by noting the particular position of rod 21 in guide 22.

While the above description refers to a few advantageous embodiments of the invention, it is obvious that various details may be changed. For example, the ring means and the collar means with which it is associated may have an elliptical cross section rather than a circular cross section. Also, the manner of fixing the blades to the ring means and the ring means to the collar members can take various different forms. Furthermore, any suitable mechanisms known in themselves may be utilized for changing the inclinations of the several throttling blades.

With the above-described structure of the invention a number of advantages are achieved. Thus, it will be seen that the control means of the invention requires very little space outside of the duct. Moreover, during adjustment of the blades the direction of gas flow remains unchanged with the structure of the invention always distributing the gas flow symmetrically with respect to the duct.

Furthermore, the range of control is extremely wide, being practically from 0 to 100 percent, and the flow aperture can easily be made substantially equal to the cross-sectional interior area of the collar member itself even though the control structure is situated in the interior of the collar member.

Furthermore, the control structure of the invention has favorable acoustic properties, in that during operation it creates very little noise. The reduction in noise generation is at least in part due to the particular engagement of the adjacent throttling blades described in detail above.

Furthermore, the manufacturing and mounting costs of the structure of the invention are extremely low, with the mounting of the structure in a duct being easily and rapidly carried out.

In addition, thermal lagging of the control means, or insulation thereof to avoid fire hazards can easily be carried out.

What is claimed is:

1. Apparatus for controlling the flow of a gas comprising: a collar member having a longitudinal axis and a pair of opposed end regions, said collar member being adapted to be sealingly connected to at least one duct member through which a gas flow stream passes so that said gas stream can flow through said collar member; means provided within said collar member between said end regions thereof for mounting a plurality of throttling blades therein; and a plurality of throttling blades, each of said throttling blades being defined by a substantially rectangular plate member having a pair of opposed long edge regions defining first and second side edge regions and a pair of opposed short edge regions, defining upstream and downstream edge regions, said plate member having a longitudinally warped transversely curved configuration, said throttling blades each being pivotally hinged to said mounting means so that said first side edge region of each throttling blade overlaps and resiliently engages the second side edge region of an adjacent throttling blade with a positive bearing force over the substantial length of said side edge regions resulting in a fluidly sealed engagement between adjacent blades, said blades defining the side surface of a truncated cone which is air tight due to said sealing engagement between the first and second side edge regions of adjacent throttling blades and whose axis coincides with said collar member axis, said blade upstream end regions defining the base of said truncated cone and said downstream end regions defining the apex of said truncated cone, and said mounting means supporting said blades for pivotal movement for adjusting the inclination of said blades and thus the size of said apex to control the size of an aperture defined by said downstream end regions of said blades through which a gas in said collar member is adapted to flow, so that by situating said blades at a predetermined inclination in said collar member the flow of air therethrough can then be regulated.

2. Apparatus as recited in claim 1 further including means for measuring the pressure differential between two longitudinally spaced points in said duct member.

3. Apparatus as recited in claim 1 wherein said plate member is defined by a plurality of transverse cross-sections, said transverse cross sections describing arcs of a circle of equal radii of curvature, the center of curvature of each such arcuate cross-section being laterally displaced in a certain direction with respect to the center of curvature of another arcuate cross-section longitudinally displaced in the upstream direction with respect thereto.

4. Apparatus as recited in claim 1 further including means operatively associated with said collar member for measuring the pressure differential of a gas flow stream between a first location upstream of the base of said truncated cone and a second location defined by said truncated cone in the vicinity of the apex thereof.

5. Apparatus as recited in claim 4 further including means for indicating the transverse area of said second location.

6. Apparatus as recited in claim 1 wherein said means for mounting said throttling blades comprises a circular ring fixed within said collar member.

7. Apparatus as recited in claim 6 wherein said ring has a diameter substantially equal to the inner diameter of said collar member and said blades being pivotally connected to said ring at the upstream end regions thereof.

8. Apparatus as recited in claim 6 wherein said ring has a diameter smaller than the diameter of said collar member and said blades being pivotally connected to said ring between the upstream and downstream end regions thereof.

9. Apparatus as recited in claim 6 wherein said circular ring is fixed within said collar member between and spaced inwardly from said opposed end regions thereof.

10. Apparatus as recited in claim 9 wherein the apex of said truncated cone defined by said throttling blades is situated in a plane which passes through one of said collar member end regions.

11. Apparatus as recited in claim 9 wherein the apex of said truncated cone defined by said throttling blades is situated in a plane which lies outside of said collar member.

12. Apparatus as recited in claim 1 and wherein an adjusting means is operatively connected with at least one blade but not to blades which are adjacent to and overlap said one blade for adjusting the inclination of said one blade by transmitting a force from said at least one blade to the adjoining blades, and said adjusting means maintaining said blades in their adjusted position when a gas flows through said duct means as well as when a gas does not flow through said duct means.

13. The combination of claim 12 and wherein said adjusting means extends through a wall portion of said collar member and has at the exterior of said collar member a portion which is accessible for carrying out the adjustment of the inclination of said one blade.

14. Apparatus as recited in claim 1 further including means for measuring the rate of flow of a gas stream through said duct.

* * * * *